(12) United States Patent
Ochi et al.

(10) Patent No.: US 6,383,311 B1
(45) Date of Patent: May 7, 2002

(54) HIGH STRENGTH DRIVE SHAFT AND PROCESS FOR PRODUCING THE SAME

(75) Inventors: Tatsuro Ochi; Hideo Kanisawa; Kenichiro Naito; Joji Tamura, all of Muroran; Masayoshi Saga, Mooka, all of (JP)

(73) Assignees: Nippon Steel Corporation; Honda Motor Co., Ltd., both of Tokyo-to (JP)

( * ) Notice: Subject to any disclaimer, the term of this patent is extended or adjusted under 35 U.S.C. 154(b) by 0 days.

(21) Appl. No.: 09/442,506

(22) Filed: Nov. 18, 1999

(30) Foreign Application Priority Data

Nov. 19, 1998 (JP) ............................................ 10-344852

(51) Int. Cl.⁷ .......................... C22C 38/14; C21D 9/28; F16C 3/02
(52) U.S. Cl. ........................................ 148/328; 572/590
(58) Field of Search ................................ 148/328, 572, 148/590

(56) References Cited

U.S. PATENT DOCUMENTS 5,536,335 A    7/1996    Burris

FOREIGN PATENT DOCUMENTS

| EP | 0332284 | | 9/1989 |
| JP | 8283910 | | 10/1996 |
| JP | 09235654 | * | 9/1997 |
| JP | 10195589 | * | 7/1998 |

* cited by examiner

*Primary Examiner*—Sikyin Ip
(74) *Attorney, Agent, or Firm*—Birch, Stewart, Kolasch & Birch, LLP

(57) ABSTRACT

Disclosed are a high strength drive shaft and a process for producing the same. The high strength drive shaft comprises as a steel material, by weight, carbon: 0.48 to 0.58%, silicon: 0.01 to 0.15%, manganese: 0.35 to 0.75%, sulfur: 0.005 to 0.15%, molybdenum: 0.1 to 0.35%, boron 0.0005 to 0.005%, aluminum: 0.015 to 0.05%, and titanium: 0.02 to 0.08%, the proportion of the effective case depth of an involute serration in its end of the drive shaft being 0.3 to 0.7 in terms of the ratio of the effective case depth t to the radius r, t/r. The involute serration in its end preferably has a former austenite grain size of not less than 8 in terms of the grain size number specified in JIS (Japanese Industrial Standards). A steel comprising the above constituents and having a hardness of 85 to 95 HRB is machined and form rolled into a shaft, and the shaft is induction hardened and then tempered at 120 to 200° C. to produce the high strength drive shaft.

6 Claims, 3 Drawing Sheets

HIGH STRENGTH DRIVE SHAFT AND PROCESS FOR PRODUCING THE SAME

TECHNICAL FIELD

The present invention relates to a high strength drive shaft and a process for producing the same. The term "strength properties" used herein refers mainly to torsional strength and torsional fatigue strength.

BACKGROUND OF THE INVENTION

Regarding drive shafts, one of automobile components, in order to cope with an increase in power of automobile engines or atmospheric control in recent years, there is an ever-increasing trend toward an increase in strength of the drive shafts. Strength properties required of drive shafts are torsional strength and torsional fatigue strength.

Japanese Patent Publication No. 62571/1988 discloses a process for producing a drive shaft, comprising the steps of: forming a steel comprising carbon: 0.30 to 0.38%, manganese: 0.6 to 1.5%, boron: 0.0005 to 0.0030%, titanium: 0.01 to 0.04%, and aluminum: 0.01 to 0.04% into a drive shaft; and induction hardening the drive shaft to a ratio of the induction hardening depth to the radius of the steel member of not less than 0.4, thus enabling the step of tempering after the induction hardening to be omitted. This publication, however, does not refer to torsional fatigue strength to which the present invention has made particular attention as strength properties.

Japanese Patent Laid-Open No. 179400/1993 discloses a steel product for direct machining and induction hardening, comprising carbon: 0.38 to 0.45%, silicon: not more than 0.35%, manganese: more than 1.0 to 1.5%, boron: 0.0005 to 0.0035%, titanium: 0.01 to 0.05%, aluminum: 0.01 to 0.06%, and nitrogen: not more than 0.01%, the steel product having a fine grain structure with a ferrite grain size number of not less than 6. This laid-open publication also refers to torsional strength, but is silent on torsional fatigue strength. Further, this steel product is considered to have unsatisfactory cold workability due to high manganese, nitrogen, or silicon content.

The steel products disclosed in the publications noted above cannot provide, as steels for drive shafts, excellent strength properties, especially excellent torsional fatigue strength properties, without difficulty. Accordingly, it is an object of the present invention to solve the above problems of the prior art and to provide a high strength drive shaft and a process for producing the same.

DISCLOSURE OF THE INVENTION

The above object can be attained by the following invention. Specifically, according to one aspect of the present invention, there is provided a high strength drive shaft including an involute serration, said drive shaft comprising as a steel material by weight carbon: 0.48 to 0.58%, silicon: 0.01 to 0.15%, manganese: 0.35 to 0.75%, sulfur: 0.005 to 0.15%, molybdenum: 0.1 to 0.35%, boron: 0.0005 to 0.005%, aluminum: 0.015 to 0.05%, and titanium: 0.02 to 0.08% and, in addition, nitrogen: limited to not more than 0.005% (inclusive of 0%), chromium: limited to not more than 0.1% (inclusive of 0%), phosphorus: limited to not more than 0.02% (inclusive of 0%), and oxygen: limited to not more than 0.002% (inclusive of 0%), with the balance consisting of iron and unavoidable impurities, the proportion of the effective case depth of the involute serration in its end being 0.3 to 0.7 in terms of the ratio of the effective case depth t to the radius r, t/r. In this case, the involute serration in its end preferably has a former austenite grain size of not less than 8 in terms of the grain size number specified in JIS (Japanese Industrial Standards).

The above object can be attained by the following invention. Specifically, according to one aspect of the present invention, there is provided a high strength drive shaft including an involute serration, said drive shaft comprising as a steel material by weight carbon: 0.48 to 0.58%, silicon: 0.01 to 0.15%, manganese: 0.35 to 0.75%, sulfur: 0.005 to 0.15%, molybdenum: 0.1 to 0.35%, boron: 0.0005 to 0.005%, aluminum: 0.015 to 0.05%, and titanium: 0.02 to 0.08% and, in addition, nitrogen: limited to not more than 0.005% (inclusive of 0%), chromium: limited to not more than 0.1% (inclusive of 0%), phosphorus: limited to not more than 0.02% (inclusive of 0%), and oxygen: limited to not more than 0.002% (inclusive of 0%), with the balance consisting of iron and unavoidable impurities, the proportion of the effective case depth of the involute serration in its end being 0.3 to 0.7 in terms of the ratio of the effective case depth t to the radius r, t/r. In this case, the involute serration in its end preferably has a former austenite grain size of not less than 8 in terms of the grain size number specified in JIS (Japanese Industrial Standards). The grain size numbers of JIS and ASTM are the same in both standards.

Use of the high strength drive shaft and the process for producing the same according to the present invention can provide drive shaft products possessing excellent torsional strength and torsional fatigue strength properties.

BEST MODE FOR CARRYING OUT THE INVENTION

Figure 1:
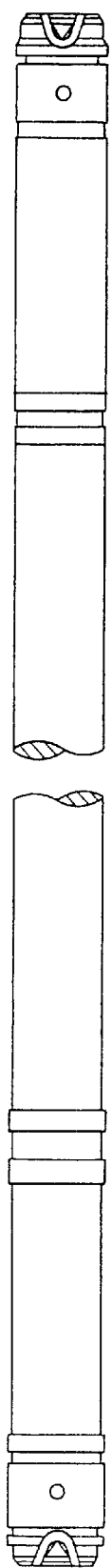
FIG. 1 is a diagram showing the shape of a drive shaft used in a torsional strength test and a torsional fatigue test.

In order to realize a high strength drive shaft and a process for producing the same, the present inventors have made extensive and intensive investigations and, as a result, have obtained the following finding.

(1) In shafts, both torsional fracture and torsional fatigue fracture occur in notches provided at the end of the involute serration. The larger the case depth, the higher the fatigue strength of the shaft. However, excessively large case depth has a fear of quenching cracks being induced. Therefore, the upper limit of the case depth should be specified.

(2) An increase in carbon content and a reduction in chromium content are important for ensuring the hardness of the hardened case. Reducing the chromium content has the effect of solutionizing cementite upon heating even for a short period of time. By virtue of this effect, unsatisfactory dissolution of carbides can be prevented.

(3) Intergranular strength also greatly affects the torsional strength and the torsional fatigue strength. Increasing the carbon content for increasing the hardness of the hardened case usually results in lowered intergranular strength. In order to cope with this, the intergranular strength is increased by the addition of boron, the addition of molybdenum, the addition of silicon, and a reduction in phosphorus content. Further, an increase in titanium content in combination with a reduction in nitrogen content causes a large amount of TiC to be finely dispersed, reduces the former austenite grain size, and improves the intergranular strength. The increased intergranular strength in turn results in improved torsional strength and torsional fatigue strength of the shaft.

(4) In the steel, a reduction in silicon content in combination with the addition of boron can avoid a deterioration in machinability and form rollability while ensuring high strength properties and high induction hardenability. Boron can increase the hardenability and, as described above, further has the effect of strengthening grain boundaries. In the case of steels with boron added thereto, the addition of titanium is indispensable. This generally leads to a deterioration in cold workability due to coarse TiN. According to the present invention, however, the nitrogen content is minimized to prevent the formation of coarse TiN. Therefore, the above unfavorable phenomenon can be prevented.

The present invention has been made based on such novel finding.

The present invention will be described in more detail.

Carbon is an element which is effective in imparting necessary strength to the steel. When the content of carbon is less than 0.48%, necessary torsional strength and other strength properties cannot be ensured. On the other hand, when the carbon content exceeds 0.58%, the steel is excessively hard, leading to deteriorated cold workability, particularly deteriorated machinability. For this reason, the carbon content should be 0.48 to 0.58%.

Silicon is an element which is effective in the deoxidation of the steel. When the content of silicon is less than 0.01%, the contemplated effect is unsatisfactory. On the other hand, a silicon content exceeding 0.15% leads to an increase in hardness and consequently deteriorates cold workability, particularly machinability. For the above reason, the silicon content should be 0.01 to 0.15%.

Manganese is an element which is effective in improving the induction hardenability. When the content of manganese is less than 0.35%, satisfactory hardenability cannot be ensured. On the other hand, a manganese content exceeding 0.75% leads to a significant increase in hardness and consequently deteriorates cold workability and machinability. Therefore, the manganese content should be 0.35 to 0.75%.

Sulfur is added to form, in the steel, MnS which functions to improve the machinability. When the content of sulfur is less than 0.005%, the contemplated effect is unsatisfactory. On the other hand, when the sulfur content exceeds 0.15%, the effect is saturated. Further, in this case, intergranular segregation occurs, leading to intergranular embrittlement. For the above reason, the sulfur content should be 0.005 to 0.15%. The sulfur content is preferably 0.005 to 0.04%.

Molybdenum is an element which functions to impart strength and hardenability to the steel and, at the same time, is effective in improving the intergranular strength after induction hardening to increase the strength properties. When the content of molybdenum is less than 0.1%, the contemplated effect is unsatisfactory. On the other hand, a molybdenum content exceeding 0.35% leads to increased hardness and consequently deteriorates cold workability and machinability. For the above reason, the molybdenum content should be 0.1 to 0.35%.

Boron is added for attaining the following three effects. (a) In steel bar and wire rod rolling, boron iron carbide is produced in the course of cooling after rolling. This increases the growth rate of ferrite, accelerates softening of the asrolled steel, and improves the cold workability and machinability of the steel material. (b) In the induction hardening, hardenability is imparted to the steel. (c) The intergranular strength of the induction hardening material is improved to improve fatigue strength and impact strength as mechanical components. When the content of boron is less than 0.0005%, the contemplated effect is unsatisfactory, while when the boron content exceeds0.005%,the effect is saturated. For this reason, the boron content should be 0.0005 to 0.005%.

Aluminum is added as a deoxidizer. When the content of aluminum is less than 0.015%, the contemplated effect is unsatisfactory. On the other hand, when the aluminum content exceeds 0.05%, the effect is saturated. Further, in this case, the hardness is increased, resulting in deteriorated cold workability and machinability. For the above reason, the aluminum content should be 0.015 to 0.05%.

Titanium produces TiN and TiC in the steel. The purpose of adding titanium is to attain the following two effects. (a) TiN is produced to prevent the precipitation of BN through the fixation of nitrogen in solid solution, that is, to ensure boron in solid solution. (b) TiC is finely dispersed to refine former austenitegrains. When the content of titanium is less than 0.02%, the contemplated effect is unsatisfactory. On the other hand, when the titanium content exceeds 0.08%, precipitation hardening by TiC is significant, leading to significantly deteriorated cold workability and machinability. For the above reason, the titanium content should be 0.02 to 0.08%.

Preferably, the content of nitrogen is minimized for the following two reasons. (a) As described above, boron is added for improving the hardenability, strengthening grain boundaries and other purposes. These effects of boron cannot be attained without the presence of boron in solid solution within the steel. Therefore, the amount of nitrogen should be reduced to suppress the production of BN. (b) Nitrogen, when combined with titanium in the steel, produces coarse TiN which increases the hardness and, in addition, is causative of cold forging cracking, resulting in significantly deteriorated cold workability. The above adverse effect is particularly significant when the nitrogen content exceeds 0.005%. For the above reason, the nitrogen content should be not more than 0.005%.

Chromium is dissolved as a solid solution in cementite to stabilize the cementite. Therefore, dissolution of cementite upon heating for a short period of time at the time of induction hardening is likely to be unsatisfactory. This is causative of uneven hardness. This behavior is particularly significant when the chromium content exceeds 0.1%. For the above reason, the chromium content should be limited to not more than 0.1%.

Phosphorus is an element which enhances the deformation resistance at the time of the cold forging and deteriorates the toughness. Therefore, phosphorus deteriorates the cold workability. Further, phosphorus embrittles grain boundaries of components after induction hardening and tempering, and consequently deteriorates the torsional strength and torsional fatigue strength of final products. Therefore, preferably, the phosphorus content is minimized. For this reason, the phosphorus content should be limited to not more than 0.02%.

Oxygen forms oxide inclusions, such as $Al_2O_3$, in the steel. When oxide inclusions are present in a large amount in the steel, the cold workability and the machinability are deteriorated. This tendency is particularly significant when the oxygen content exceeds 0.002%. Therefore, the oxygen content should be limited to not more than 0.002%.

According to the present invention, the drive shaft including an involute serration comprises the above steel as a material, and the proportion of the effective case depth of the involute serration in its end is brought to 0.3 to 0.7 in terms of the ratio of the effective case depth t to the radius r, t/r. The effective case depth referred to herein is the effective case depth as measured by the method of measuring the case depth hardened by induction hardening, as specified in JIS G 0559. The reasons for the limitation of the effective case depth according to the present invention will be described.

In shafts, both torsional fracture and torsional fatigue fracture occur in notches provided at the end of the involute serration. The torsional strength and the torsional fatigue strength of the shaft can be increased by increasing the effective case depth of the involute serration in its end. When the proportion of the effective case depth is less than 0.3 in terms of the ratio of the effective case depth t to the radius r, t/r, the contemplated effect is unsatisfactory.

On the other hand, when the proportion of the effective case depth in terms of t/r exceeds 0.7, the effect is saturated. Further, in this case, the compression residual stress of the case is reduced, leading to a fear of quenching cracks being created. For the above reason, the proportion of the effective case depth of the involute serration in its end is limited to 0.3 to 0.7 in terms of the ratio of the effective case depth t to the radius r, t/r.

According to a preferred embodiment of the present application, in order to further improve the strength properties of the shaft, the former austenite grain size of the involute serration in its end is brought to not less than 8 in terms of the grain size number specified in JIS. The reason why the grain size in the above range can further improve the strength properties of the shaft is as follows. The torsional strength and torsional fatigue hardness of the shaft are influenced by the intergranular strength of the former austenite. The finer the grains, the smaller the amount of impurities segregated within grain boundaries and the better the intergranular strength. This effect is particularly significant when the former austenite grain size is not less than 8 in terms of the grain size number specified in JIS.

For the above reason, the former austenite grain size of the involute serration in its end is brought to not less than 8 in terms of the grain size number specified in JIS. An example of an effective method for bringing the former austenite grain size number to not less than 8 is such that, in producing a steel bar as a steel material by hot rolling, the heating temperature is brought to 1100° C. or above to once solutionize TiC in as large an amount as possible, permitting a large amount of fine TiC to be dispersed at the time of heating in the induction hardening.

Next, the process for producing a high strength drive shaft according to the present invention will be described.

According to the production process of the present invention, the hardness of the steel material is 85 to 95 HRB. When the hardness is less than 85 HRB, scuffing occurs at the time of machining, resulting in satisfactory surface roughness. On the other hand, when the hardness exceeds 95 HRB, the abrasion loss of the cutting tool is significant. For the above reason, the hardness of the steel material is limited to 85 to 95 HRB.

An example of a method for bringing the hardness of the steel material in an as-hot rolled state to the above hardness range is such that, in producing a steel bar as a steel material by hot rolling, the finishing temperature in the hot rolling is brought to 700 to 860° C. and, subsequent to the hot rolling, slow cooling is performed from 750 to 500° C. at a cooling rate of not more than 1° C./sec. In the slow cooling, the cooling rate may be lowered, for example, by installing a heat retaining cover or a heat retaining cover provided with a heat source behind the rolling line.

According to the process of the present invention, the above steel is then machined and form rolled into a predetermined shape, followed by induction hardening and tempering at 120 to 200° C. According to the present invention, if necessary, the step of softening may be provided prior to the machining. After the induction hardening, tempering is carried out in the temperature range of 120 to 200° C. to recover the toughness of the steel product after the induction hardening, thereby improving the torsional strength and the torsional fatigue strength. When the tempering temperature is below 120° C., the contemplated effect is small, while when the tempering temperature is above 200° C., the strength is lowered.

EXAMPLES

The chemical compositions of steels according to the present invention and comparative steels used in the following examples and comparative examples are summarized in Table 1. Steel Nos. 1 to 3 of the invention respectively have the same chemical compositions as steels corresponding to S50C, S53C, and S55C, except that the content of silicon, the content of manganese, and the content of phosphorus have been lowered, molybdenum and boron have been added, and titanium has been added in an amount of 0.039 to 0.060%. On the other hand, comparative steel Nos. 4 and 5 respectively have the same chemical compositions as steels corresponding to S40C and S53C, except that boron has been added and, in addition, titanium has been added in an amount of 0.029 to 0.031%.

TABLE 1

| Classification | No. | Constituents of material under test, wt % | | | | | | | | | | | |
| --- | --- | --- | --- | --- | --- | --- | --- | --- | --- | --- | --- | --- | --- |
| | | C | Si | Mn | S | Mo | B | Al | Ti | N | Cr | P | O |
| Steel of inv. | 1 | 0.51 | 0.02 | 0.36 | 0.020 | 0.18 | 0.0020 | 0.022 | 0.039 | 0.0041 | 0.05 | 0.009 | 0.0013 |
| | 2 | 0.53 | 0.08 | 0.44 | 0.021 | 0.23 | 0.0019 | 0.027 | 0.058 | 0.0037 | 0.05 | 0.009 | 0.0014 |
| | 3 | 0.55 | 0.09 | 0.55 | 0.018 | 0.25 | 0.0025 | 0.027 | 0.060 | 0.0045 | 0.05 | 0.008 | 0.0012 |
| Comp. steel | 4 | 0.42 | 0.07 | 0.70 | 0.017 | 0.01 | 0.0010 | 0.023 | 0.029 | 0.0081 | 0.18 | 0.017 | 0.0013 |
| | 5 | 0.53 | 0.20 | 0.84 | 0.016 | 0.01 | 0.0014 | 0.022 | 0.031 | 0.0083 | 0.15 | 0.014 | 0.0012 |

150 kg of each of the test steels having chemical compositions specified in Table 1 was produced by the melt process in a vacuum melting furnace. These steels were hot forged into square bars having a size of 162 mm square which were then hot rolled into steel bars having a diameter of 25 mm. For the steels of the present invention, the roll finishing temperature was 700 to 860° C., and, after the rolling, slow cooling was performed using a slow cooling cover device from 750 to 500° C. at a cooling rate of not more than 0.8° C./sec. The hardness of these steel bar materials was measured with a Rockwell hardness meter. The steel bars were then machined and form rolled into shafts having a shape shown in FIG. 1, followed by induction hardening. Tempering was carried out at 180° C. for one hr.

Serrations located respectively at both ends of the shaft were fixed, and then tested for torsional strength and torsional fatigue. For the test piece for torsional strength, the induction hardening and tempering procedure was carried out so that the target proportion of the case. depth of the involute serration in its end was t/r=0.50. The grain size was measured by the method according to JIS G 0551. The case depth was measured by the method of measuring the case depth hardened by induction hardening, as specified in JIS G 0559, and the proportion of the case depth was determined based on the case depth.

The proportion of the case depth of the involute serration in its end after induction hardening and tempering was 0.44 to 0.55. The fracture form and the torsional strength for the induction hardened materials and the surface hardness of the involute serration in its end after the induction hardening, the former austenite grain size number, and the hardness of the steel materials are shown in FIG. 2.

Figure 2:
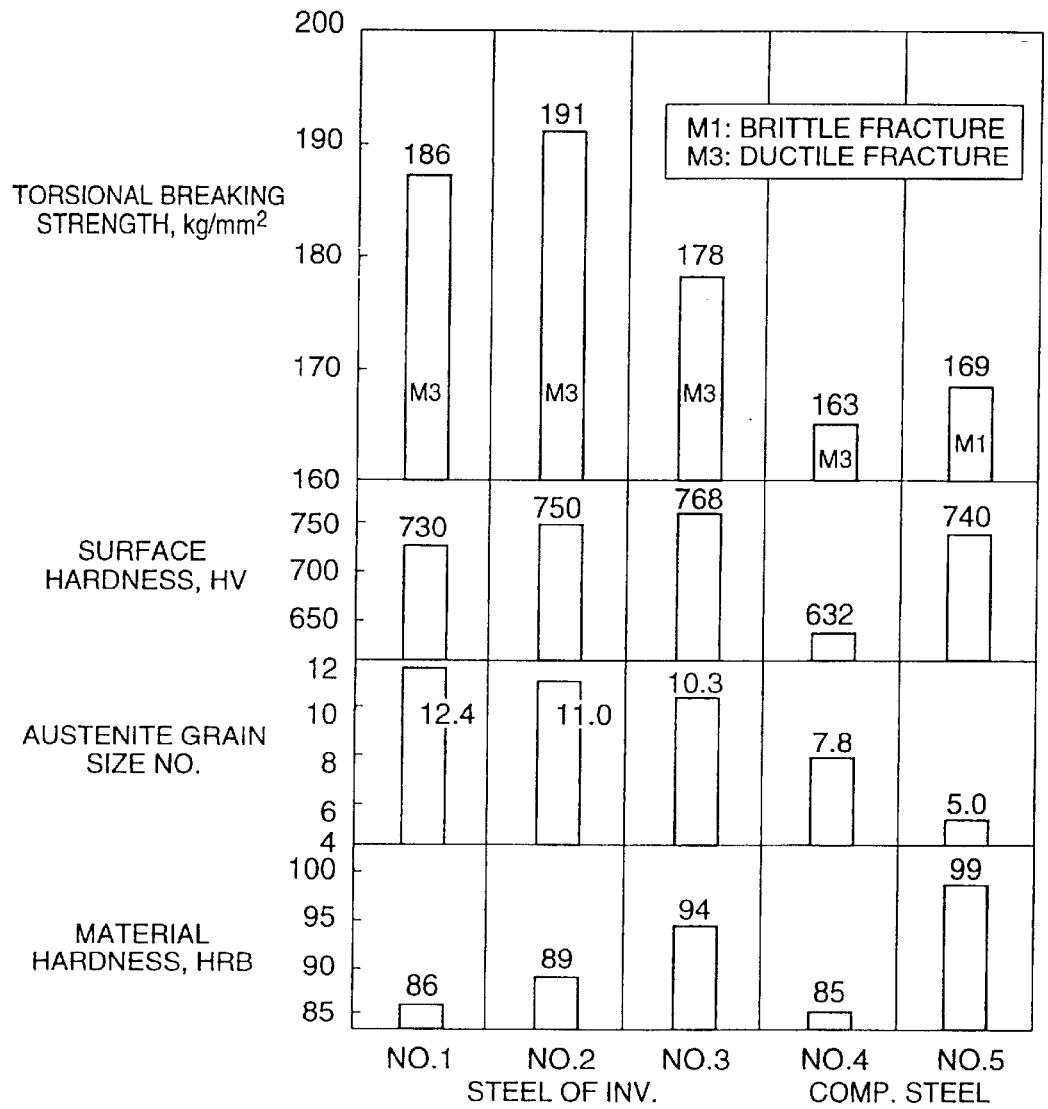
FIG. 2 is a diagram showing the quality and torsional strength properties of induction hardened materials.

As is apparent from FIG. 2, as compared with the comparative steels, the steels of the present invention have lower material hardness and have better machinability and form rollability in the production of shafts. The material hardness of comparative steel No. 5 was higher than the upper limit of the hardness range specified in the present invention. Consequently, the machinability and the form rollability were unsatisfactory. For comparative steel No. 5, the contents of manganese, chromium, and nitrogen were higher than the respective upper limits of the manganese, chromium, and nitrogen content ranges specified in the present invention. For the steels of the present invention, former austenite grains after induction hardening and tempering were finer than those for the comparative steels. Unsatisfactory refinement in comparative steel Nos. 4 and 5 is attributable to the fact that the nitrogen content was higher than the upper limit of the nitrogen content range specified in the present invention and this high nitrogen content led to the production of a large amount of TiN and rendered the amount of fine TiC produced unsatisfactory.

Further, for the steels of the present invention, the fracture form was ductile fracture, and, as compared with the comparative steels, the torsional strength was higher. The unsatisfactory strength for comparative steel No. 4 is attributable to the fact that the carbon and molybdenum contents were lower than the respective lower limits of the carbon and molybdenum content ranges specified in the present invention and the chromium and nitrogen contents were higher than the respective upper limits of the chromium and nitrogen content ranges specified in the present invention. The unsatisfactory strength for comparative steel No. 5 is attributable to the fact that the molybdenum content was lower than the lower limit of the molybdenum content range specified in the present invention and the chromium and nitrogen contents were higher than the respective upper limits of the chromium and nitrogen content ranges specified in the present invention.

Figure 3:
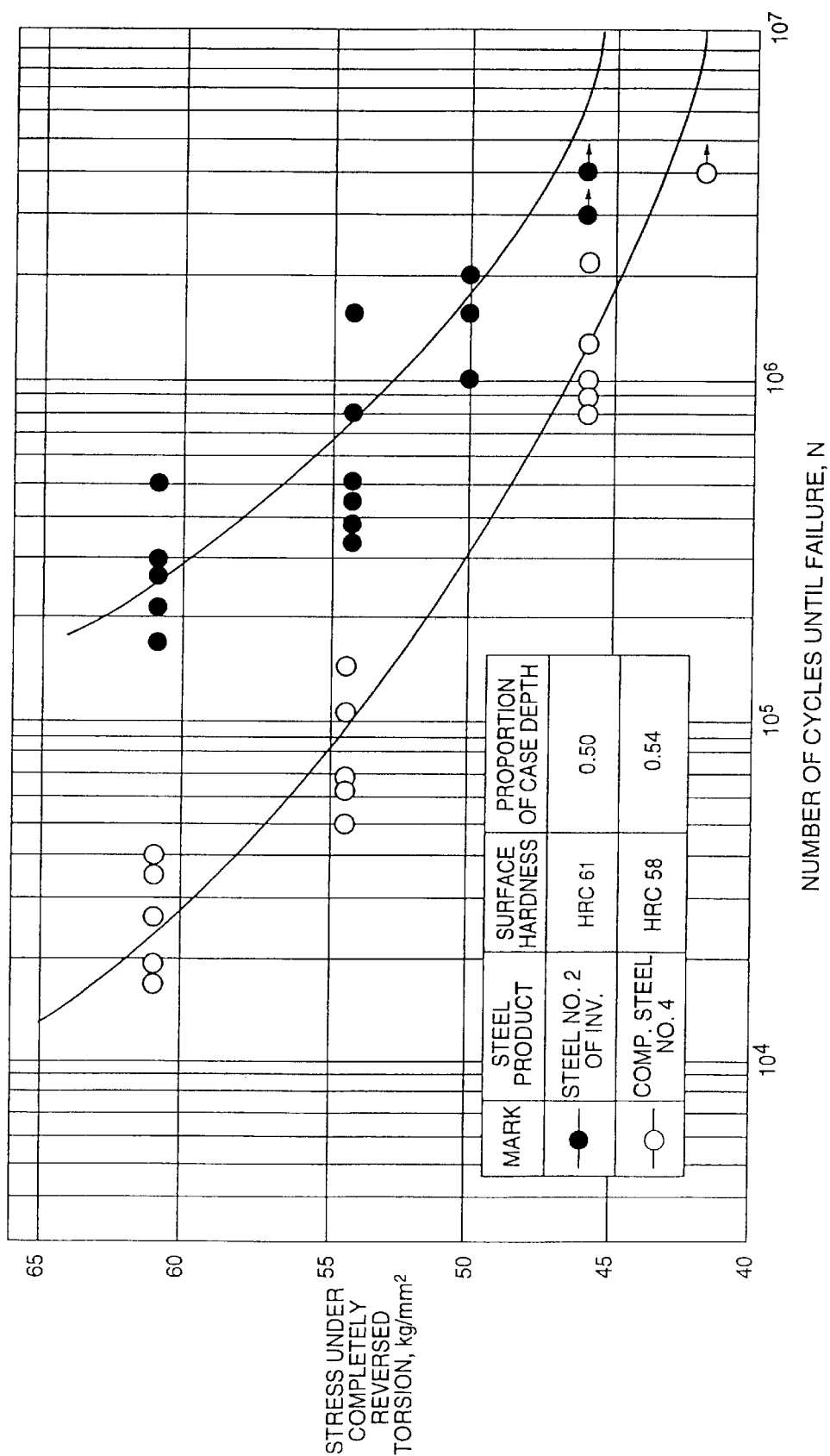
FIG. 3 is a diagram showing torsional fatigue strength properties of induction hardened materials.

For steel No. 2 of the invention and comparative steel No. 4, the shafts after induction hardening and tempering were tested for torsional fatigue to determine the torsional stress and the number of stress cycles until the shaft failed. The results are shown in FIG. 3. As is apparent from FIG. 3, the steel of the present invention had higher fatigue strength than the comparative steel over the whole service life zone.

Next, for steel No. 3, shafts were produced in the same manner as described above. In this case, the proportion of the case depth of the involution serration in its end was varied as indicated in Table 2 by regulating the induction hardening conditions. For the shafts thus obtained,the torsional strength, together with the former austenite grain size of the involute serration in its end, is shown in Table 2.

TABLE 2

| Classification | No. | Effective case depth of involute serration, t/r | Former austenite grain size number of involute serration | Torsional strength, kg/mm$^2$ |
| --- | --- | --- | --- | --- |
| Ex. of inv. | 1 | 0.35 | 11.0 | 175 |
| | 2 | 0.55 | 7.9 | 175 |
| | 3 | 0.64 | 7.2 | 176 |
| Comp. Ex. | 4 | 0.25 | 11.9 | 163 |
| | 5 | 0.78 | 7.0 | 167 |

As is apparent from Table 2, the shafts according to the examples of the present invention had excellent torsional strength. Comparison of Example 1 of the present invention with Example 2 of the present invention shows that, for Example 1 of the present invention, by virtue of finer former austenite grains, the shaft had good strength for its small case depth. By contrast, for Comparative Examples 4 and 5, the torsional strength was inferior due to a lower effective case depth than the lower limit of the effective case depth range specified in the present invention (Comparative Example 4) or a higher effective case depth than the upper limit of the effective case depth range specified in the present invention (Comparative Example 5).

The high strength drive shaft and the process for producing the same according to the present invention can provide excellent torsional strength and torsional fatigue strength properties as a drive shaft. Further, by virtue of the reduced material hardness, the turnability and the form rollability are also good. Thus, the effect of the present invention is very significant from an industrial viewpoint.

What is claimed is:

1. A high strength drive shaft including an involute serration, said drive shaft comprising a steel material by weight carbon: 0.48 to 0.58%
silicon: 0.01 to 0.15%
manganese: 0.35 to 0.75%
sulfur: 0.005 to 0.15%
molybdenum: 0.1 to 0.35%
boron: 0.0005 to 0.005% aluminum: 0.015 to 0.05%, and titanium: 0.02 to 0.08% and, in addition, nitrogen: limited to not more than 0.005% (inclusive of 0%), chromium: limited to not more than 0.05% (inclusive of 0%), phosphorus: limited to not more than 0.02% (inclusive of 0%), and oxygen: limited to not more than 0.002% (inclusive of 0%), with the balance consisting of iron and unavoidable impurities, the effective case depth of the involute serration in its end being 0.3 to 0.7 in terms of the ratio of the effective case depth t to the radius r, t/r.

2. The high strength drive shaft according to claim 1, wherein the involute serration in its end has a former austenite grain size of not less than 8 in terms of the grain size number specified in ASTM.

3. The high strength drive shaft according to claim 1, wherein sulfur is 0.005 to 0.04%.

4. A process for producing a high strength drive shaft including an involute serration, said process comprising the steps of: machining and form rolling a steel comprising by weight carbon: 0.48 to 0.58%, silicon: 0.01 to 0.15%, manganese: 0.35 to 0.75%, sulfur: 0.005 to 0.15%, molybdenum: 0.1 to 0.35%, boron: 0.0005 to 0.005%, aluminum: 0.015 to 0.05%, and titanium: 0.02 to 0.08% and, in addition, nitrogen: limited to not more than 0.005% (inclusive of 0%), chromium: limited to not more than 0.1% (inclusive of 0%), phosphorus: limited to not more than 0.02% (inclusive of 0%), and oxygen: limited to not more than 0.002% (inclusive of 0%), with the balance consisting of iron and unavoidable impurities, the steel having a hardness of 85 to 95 HRB, into a shaft having a predetermined shape; and then induction hardening the shaft and tempering the induction hardened shaft at 120 to 200° C., thereby producing a drive shaft with an involute serration in its end having a proportion of an effective case depth of 0.3 to 0.7 in terms of the ratio of the effective case depth t to the radius r, t/r.

5. The process according to claim 4, wherein the former austenite grain size of the involute serration in its end is brought to not less than 8 in terms of the grain size number specified in ASTM.

6. The process according to claim 4, wherein sulfur is 0.005 to 0.04%.

* * * * *